United States Patent
Grandel et al.

(10) Patent No.: US 8,454,073 B2
(45) Date of Patent: Jun. 4, 2013

(54) CLOSING SCREEN DEVICE

(75) Inventors: Johannes Grandel, Friedberg (DE);
Georg Nehm, Niedernberg (DE);
Marcel Rigorth, Babenhausen (DE);
Günter Urlaub, Schaafheim (DE)

(73) Assignee: Continental Automotive GmbH, Hannover (DE)

( * ) Notice: Subject to any disclaimer, the term of this patent is extended or adjusted under 35 U.S.C. 154(b) by 167 days.

(21) Appl. No.: 12/227,889

(22) PCT Filed: May 25, 2007

(86) PCT No.: PCT/EP2007/055076
§ 371 (c)(1),
(2), (4) Date: Dec. 1, 2008

(87) PCT Pub. No.: WO2007/137998
PCT Pub. Date: Dec. 6, 2007

(65) Prior Publication Data
US 2009/0090476 A1    Apr. 9, 2009

(30) Foreign Application Priority Data

May 31, 2006  (DE) .......................... 10 2006 025 382

(51) Int. Cl.
*B60N 3/12*         (2006.01)
(52) U.S. Cl.
USPC ........................................ 296/37.12; 296/70
(58) Field of Classification Search
USPC ............. 296/37.9, 37.12, 24.3, 37.8, 70, 223, 296/216.02, 24.34, 217; 348/837; 160/368.1; 312/319.1
See application file for complete search history.

(56) References Cited

U.S. PATENT DOCUMENTS

| 4,126,352 | A | * | 11/1978 | Vogel | 296/218 |
|---|---|---|---|---|---|
| 6,241,300 | B1 | * | 6/2001 | Suzuki | 296/37.8 |
| 6,454,347 | B2 | * | 9/2002 | Lee et al. | 296/223 |
| 6,499,788 | B2 | * | 12/2002 | Ito et al. | 296/70 |
| 6,669,258 | B1 |  | 12/2003 | Kato |  |
| 6,783,166 | B2 | * | 8/2004 | Kato | 296/37.12 |
| 6,879,079 | B2 |  | 4/2005 | Vollmer |  |
| 6,932,402 | B2 | * | 8/2005 | Niwa et al. | 296/24.34 |
| 7,063,370 | B2 | * | 6/2006 | Schmidt et al. | 296/70 |
| 7,234,746 | B2 | * | 6/2007 | Sakakibara et al. | 296/24.34 |
| 7,685,901 | B2 | * | 3/2010 | Leopold et al. | 74/434 |
| 8,328,265 | B2 | * | 12/2012 | Danz et al. | 296/37.8 |
| 2002/0101091 | A1 | * | 8/2002 | Ito | 296/37.12 |

FOREIGN PATENT DOCUMENTS

| DE | 199 38 690 |  | 2/2001 |
| DE | 100 08 887 |  | 10/2001 |
| DE | 100 08 887 | A1 | 10/2001 |
| DE | 101 20 314 |  | 3/2002 |
| DE | 101 24 415 | A1 | 11/2002 |
| DE | 103 36 506 |  | 3/2005 |
| JP | 2004-217187 | A | 8/2004 |

* cited by examiner

*Primary Examiner* — Glenn Dayoan
*Assistant Examiner* — Pinel Romain
(74) *Attorney, Agent, or Firm* — Cozen O'Connor

(57) ABSTRACT

The invention relates to a closing screen device for closing an opening (3) by a cover in a motor vehicle component, including a drive mechanism through which a closing screen (5) can be drive-displaced from an uncovered opening position exposing the opening (3) to a closed position closing the opening (3), and in said closing position, the closing screen (5) is located flush to the edge area of the motor vehicle component which surrounds said closing screen.

17 Claims, 5 Drawing Sheets

CLOSING SCREEN DEVICE

PRIORITY CLAIM

This is a U.S. national stage of application No. PCT/EP2007/055076, filed on 25 May 2007, which claims priority to German Application No. 10 2006 025 382.5 filed 31 May 2006, the contents of both which are incorporated here by reference.

BACKGROUND OF THE INVENTION

1. Field of the Invention

The invention relates to a closing screen device for covering an opening in a component of a motor vehicle so as to close said opening, having a drive mechanism by means of which a closing screen can be driven such that it can move from an opening position, which unblocks the opening, to a closed position which closes the opening and in which the closing screen is in a position flush with that edge region of the component of the motor vehicle which surrounds said closing screen.

2. Description of the Prior Art

Closing screen devices of this type serve to unblock an opening in a component of a motor vehicle, in particular in a dashboard, if, for example, a display such as a monitor is to be moved out of a recess into an active position when required. If the information which can be displayed by the display is not needed at the moment in question, the display can be retracted into the recess and the opening of the recess can be closed by the closing screen. In this case, only a gap which is as small and uniform as possible should be visible between the circumferential edges of the opening and the closing screen in the closed position of the closing screen.

SUMMARY OF THE INVENTION

The object of the invention is therefore to provide a closing screen device of the type mentioned in the introduction which, together with a simple design, permits the opening to be closed with a small gap between the circumferential edges of the opening and the closing screen.

According to the invention, this object is achieved in that a cover support which extends in the movement direction of the closing screen can be driven by a reversible drive such that it can move between the opening position and the closed position in the direction of its longitudinal extent, with that end region of the closing screen which is at the front in the closing movement direction being mounted in an articulated manner on the cover support such that it can pivot about a pivot axis which extends transverse to the movement direction, said pivot axis being able to move freely along the extent of the cover support by an internal clearance, and with that end region of the closing screen which is at the rear in the closing movement direction being connected to the cover support by means of a tilting lever which, by way of one end, is mounted on the closing screen and, by way of its other end, is mounted on the cover support in an articulated manner such that it can pivot about axes which are parallel to the pivot axis, and is spring-loaded in relation to the cover support, having a stop by means of which the ability of the closing screen to move in the closing movement direction is limited before the closed position of the cover support is reached.

By virtue of this development, the closing screen can, in a simple manner, be moved into the opening from below in order to close the opening, so that the closing screen which is free at its circumferential edge closes the opening with little play in relation to the circumferential edge of said opening.

This also largely prevents dirt entering the recess beneath the closing screen through the gap.

The small width of the gap also leads to visually uniform surfaces of the closing screen and that region of the component of the motor vehicle, for example a dashboard, which surrounds said closing screen.

If all or some of the closing screen is beneath that edge region of the component of the motor vehicle which surrounds said closing screen in the opening position of said closing screen, said closing screen does not create a visual disturbance in its opening position.

The cover support can be moved along a linear movement path or else along an arcuate movement path, depending on the installation space available.

For positioning purposes, the cover support can, in a simple manner, be guided such that it can move in a guide which is fixed to the vehicle.

This guide may be formed in an edge region of the recess whose opening can be closed by the closing screen.

A simple development of this involves the cover support being guided such that it can move in a guide groove.

The cover support can be driven so as to move by the cover support being a toothed rack in which a drive pinion of the drive engages, it preferably being possible to drive the drive pinion such that it can be rotated by electric motor.

A simple development of the internal clearance involves the internal clearance being formed by an elongate hole which extends in the direction of extent of the cover support and into which a joint pin projects, said joint pin extending coaxially to the pivot axis and being arranged at that end of the closing screen which is at the front in the closing movement direction.

If, in this case, the joint pin is arranged on the closing screen by means of an eccentric and can be adjusted such that it can rotate about the eccentric axis, the height of the closing screen can be adjusted in a simple manner in the closed position of the closing screen such that it is largely exactly flush with that edge region of the component of the motor vehicle which surrounds said closing screen.

Only little installation space is required if the tilting lever is spring-loaded in relation to the cover support by means of a prestressed torsion spring.

The closing screen is guided in a stable, positionally accurate manner by two identical cover supports being arranged parallel to and at a distance from one another, with the stability being further improved if the two cover supports are firmly connected to one another by one or more crossmembers.

In order to be able to drive the cover support without twisting, a drive axle which can be driven in rotation by the drive can be arranged such that it extends transverse to the movement direction of the closing screen and is fitted with two drive pinions which each engage in a toothed rack.

If the stop can be variably adjusted in the movement direction of the closing screen, the closing screen can be exactly adjusted in the movement direction in its closed position.

A monitor can also be driven such that it can move from an inactive position, which is covered by the closing screen in the closed position, to an active position, which projects out of the opening in the opening position of the closing screen, in a movement-linked manner by the drive, so that both driving of the movement of the closing screen and driving of the movement of the monitor can be matched to one another by a single drive.

BRIEF DESCRIPTION OF THE DRAWINGS

An exemplary embodiment of the invention is illustrated in the drawings and will be described in greater detail in the text which follows.

DETAILED DESCRIPTION OF THE PREFERRED EMBODIMENTS

Figure 1:
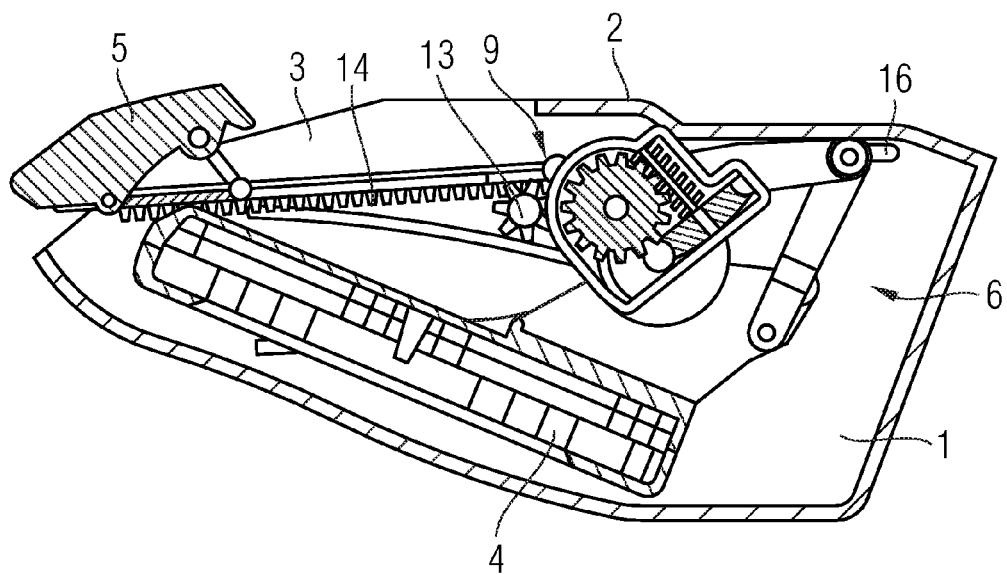
FIG. 1 shows a cross section through an on-board monitor device with a closing screen device in the active position in accordance with one embodiment of the invention.

The on-board monitor device illustrated in FIGS. 1 to 4 is arranged in a recess 1 in a dashboard 2, with the recess 1 having an opening 3 which, in the inactive position illustrated in FIG. 1, is covered by a closing screen 5 with the monitor 4 retracted into the recess 1.

Figure 3:
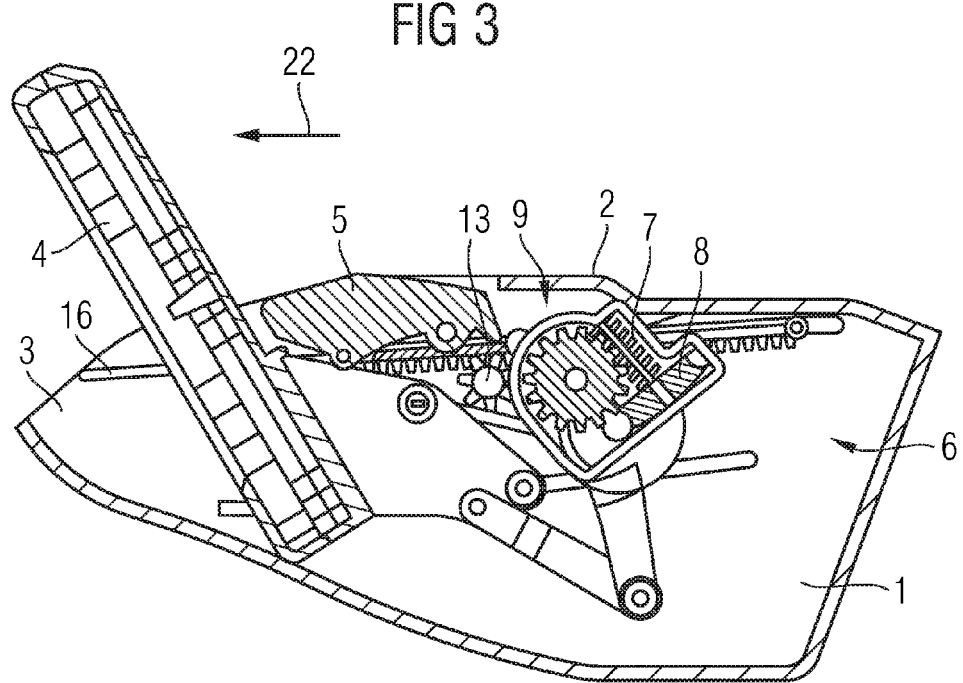
FIG. 3 shows the on-board monitor device according to FIG. 1 with the closing screen in the opening position and the monitor partly extended.
Figure 4:
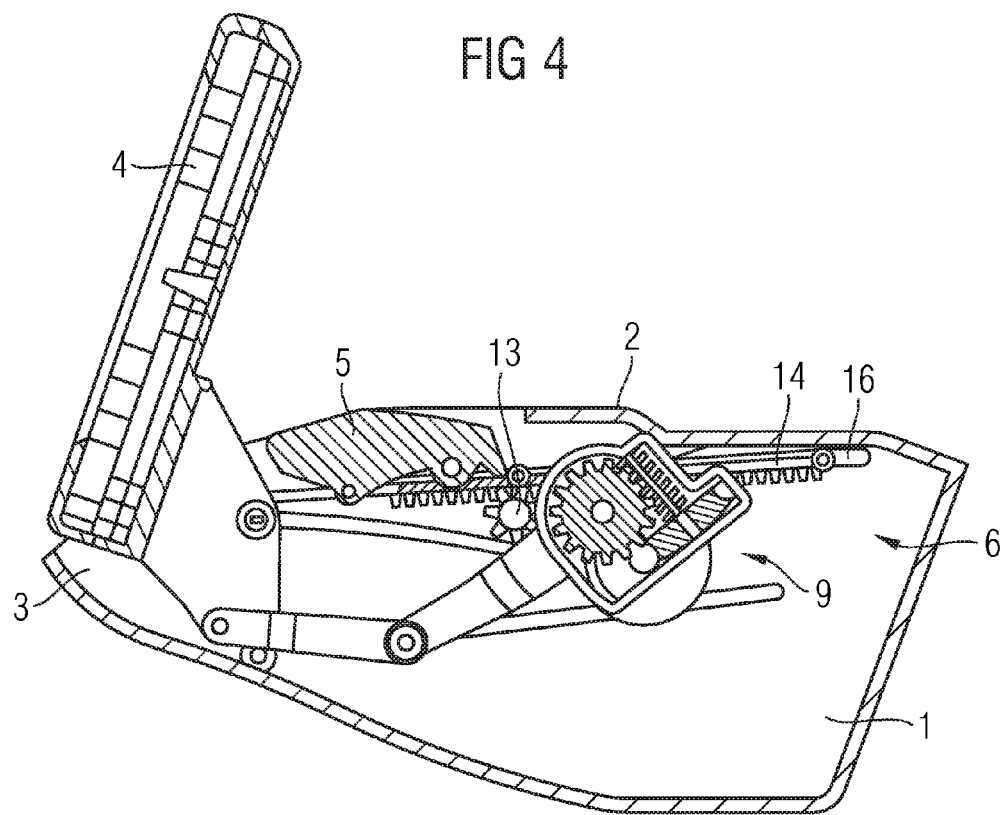
FIG. 4 shows the on-board monitor device according to FIG. 1 in the active position with the closing screen in the opening positions.

A common drive 6 can drive the closing screen 5 such that it can move into a position which unblocks the opening 3 (FIG. 2), and then can move the monitor 4, via an intermediate position (FIG. 3), into an extended active position (FIG. 4).

In this active position, the monitor 4 is in a position in which it can be seen by a driver or passenger in a vehicle.

The monitor 4 and closing screen 5 can be driven such that they are moved back to their inactive position in the reverse order.

For the purpose of driving the movement of the monitor 4, a spindle shaft 7 can be driven in rotation by the output shaft of a reversible electric motor and a spindle wheel 8 can be driven in rotation by the spindle shaft 7, said spindle wheel being arranged in a rotationally fixed manner on a drive shaft, which can rotate about an axis, of a drive disc of the drive mechanism 9 for the monitor 4 and closing screen 5.

Figure 9:
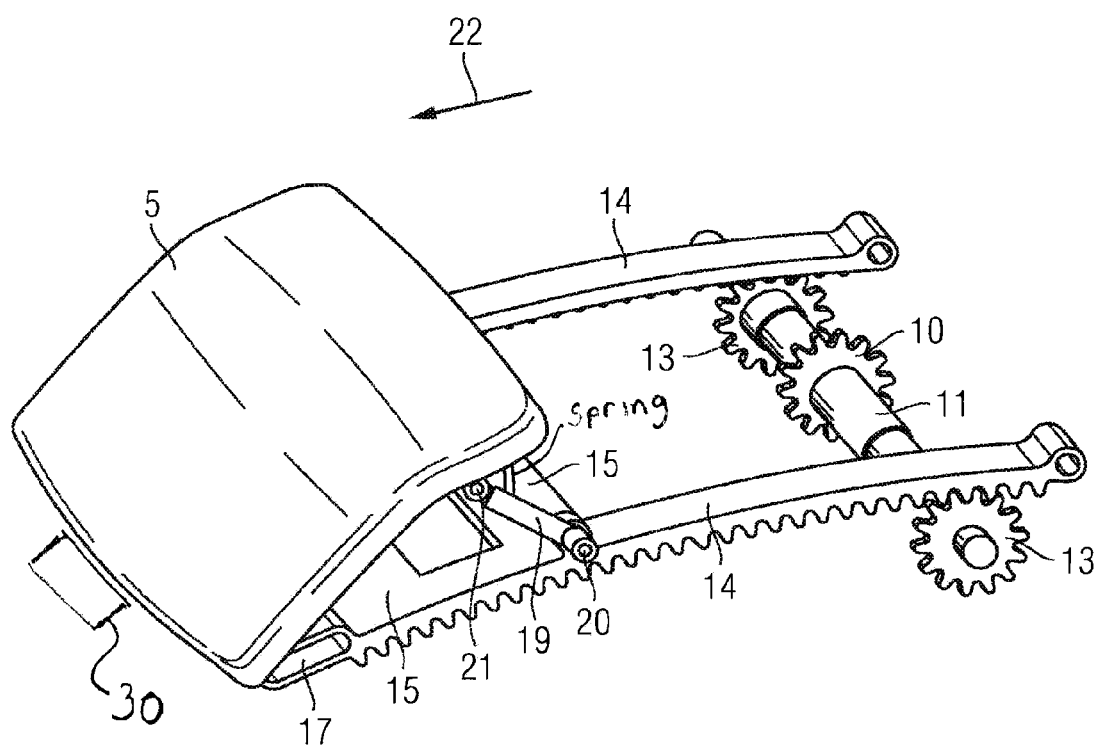
FIG. 9 shows a further perspective view of the closing screen device according to FIG. 1 in its closed position.

The drive mechanism 9 has a screen drive disc which can be driven in rotation and has a concentric toothed sector at its circumferentially peripheral edge region, said toothed sector engaging in a pinion 10 which is arranged in a rotationally fixed manner in the center of a drive axle 11 (FIG. 9).

The drive axle 11 extends transverse to the movement direction 12 of the closing screen 5 and is fitted with a drive pinion 13 at each of its two ends.

The two drive pinions 13 engage in the teeth of an arcuate toothed rack 14 in each case, said toothed racks being arranged parallel and at a distance from one another and being firmly connected to one another by means of crossmembers 15.

The two toothed racks 14 are guided such that they can move in a linear manner at their edge which is lateral to the movement direction 12 by means of guide cams (not illustrated) in guide grooves 16 in the wall of the recess 1, said guide grooves extending in the movement direction 12 of the closing screen 5. At the end region which is at the front in the closing movement direction 22 of the closing screen 5, elongated holes 17 are formed in the toothed racks 14, said elongated holes extending in the direction of extent of the toothed racks 14 and joint pins 18, which in each case extend parallel to the drive axle 11 and are arranged at that end of the closing screen 5 which is at the front in the closing movement direction 22, engaging in said elongated holes.

As a result, the closing screen 5 is fixed to the toothed racks 14 in a pivotable manner.

That end region of the closing screen 5 which is at the rear in the closing movement direction 22 is connected to the toothed racks 14 in each case by means of a tilting lever 19 which, by way of one end, is mounted on the closing screen 5 and, by way of its other end, is mounted on the toothed racks 14 in an articulated manner such that it can pivot about axes 20 and 21 which are parallel to the drive axle 11.

The tilting levers 19 are spring-loaded in relation to the toothed racks 14 by torsion springs (not illustrated).

Figure 5:
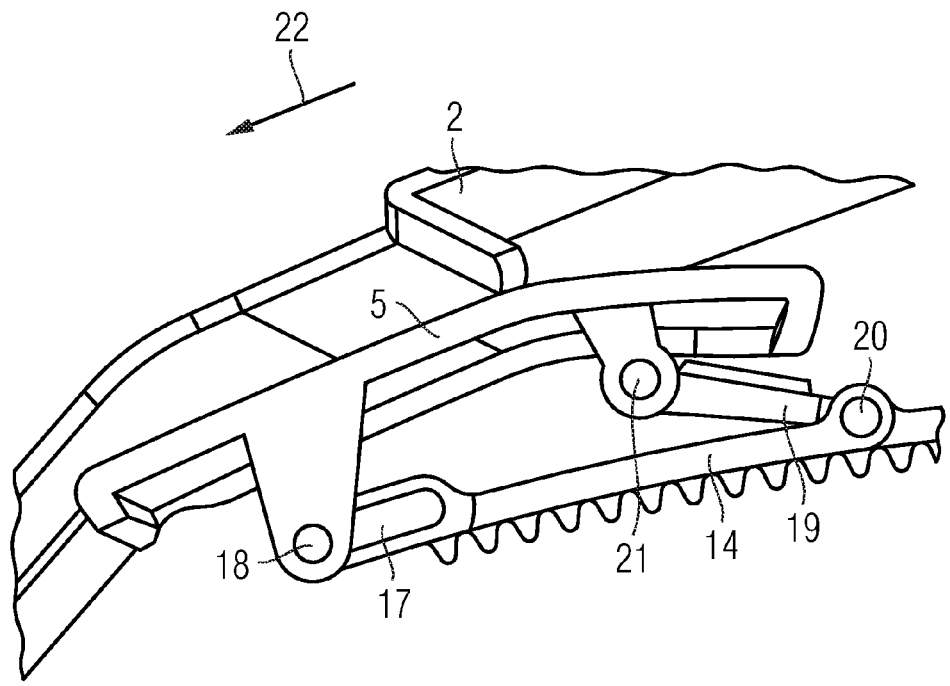
FIG. 5 shows a perspective view of the closing screen device according to FIG. 1 in its opening position.

If the closing screen 5 is in the opening position illustrated in FIGS. 4 and 5 and the opening 3 is to be closed, the toothed racks 14 are driven in the closing movement direction 22 by the drive pinions 13.

Figure 2:
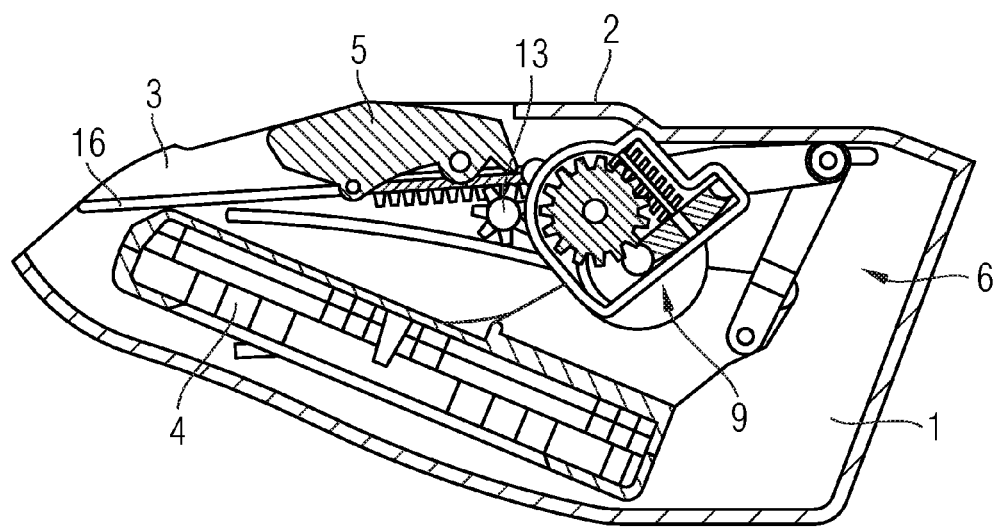
FIG. 2 shows the on-board monitor device according to FIG. 1 with the closing screen open and the monitor retracted.
Figure 6:
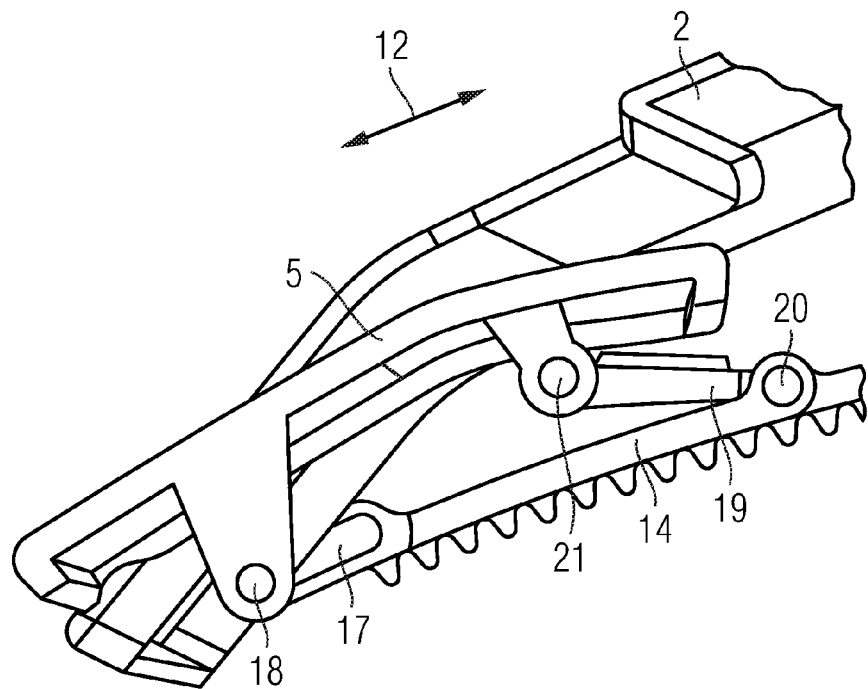
FIG. 6 shows a perspective view of the closing screen device according to FIG. 1 in a first phase of the closing process.
Figure 7:
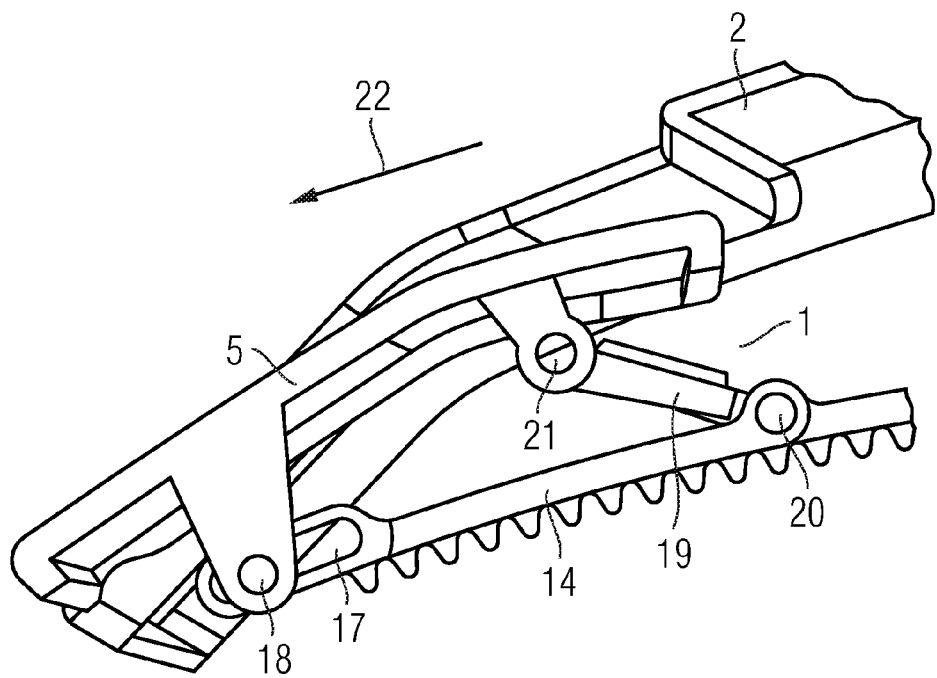
FIG. 7 shows a perspective view of the closing screen device according to FIG. 1 in a second phase of the closing process.

In this case, a movement according to FIGS. 3 and 6 is carried out by the toothed racks 14 and the closing screen 5 until, according to FIGS. 2 and 7, the closing screen 5 comes to rest against a stop 30, so that the closing screen 5 cannot move further in the closing movement direction 22.

Figure 8:
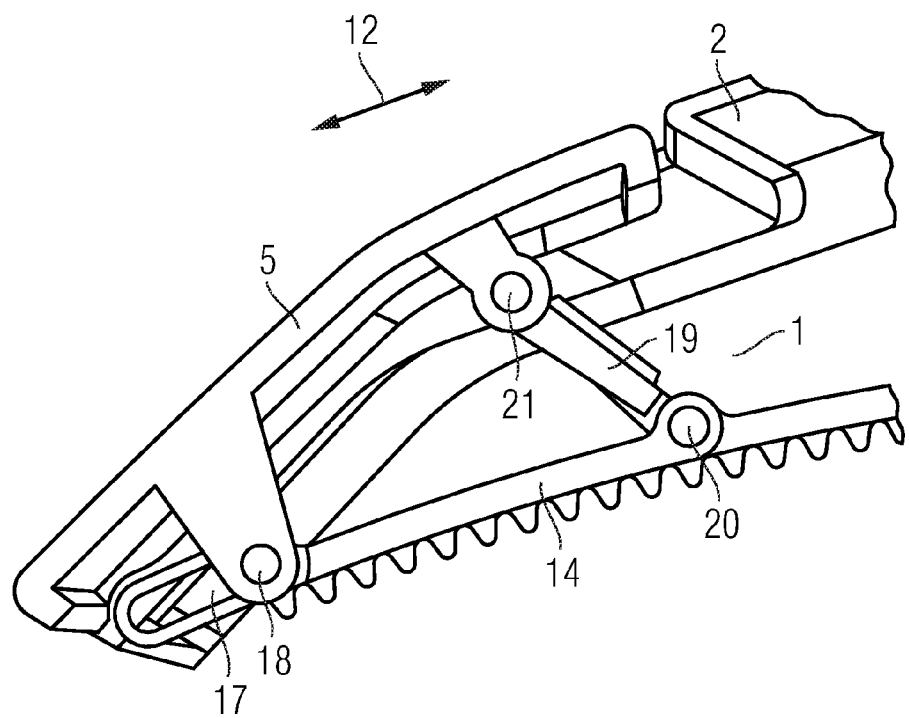
FIG. 8 shows a perspective view of the closing screen device according to FIG. 1 in its closed position.

Irrespective of this, the toothed racks 14 are moved further in the closing movement direction, until the joint pins 18 have shifted from the left-hand end of the elongate holes 17, which end is closer to the free end of the toothed racks 14, to the opposite, right-hand end of the elongate holes 17 (FIGS. 1 and 8).

In this case, the tilting levers 18 are simultaneously pivoted, against the force of the torsion springs, out of their pivot position close to the toothed racks 14 into a pivot position remote from the toothed racks 14, and therefore that end of the closing screen 5 which is at the rear in the closing movement direction 22 is also raised into the closed position of the closing screen 5.

This process is performed in the reverse order for opening purposes.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A closing device adapted to cover an opening in a component of a motor vehicle so as to close the opening, the closing device comprising:
    a closing screen adapted to be driven between an open position, which unblocks the opening, and a closed position, which blocks the opening;

a cover support having a longitudinal extent which extends in a movement direction of the closing screen, wherein a front-end region, in a closing direction of the closing screen, is connected in an articulated manner to the cover support such that the closing screen is pivotable about a pivot axis which extends transverse to the movement direction, said pivot axis being able to move freely along the extent of the cover support in an internal clearance defined by the cover support;

a reversible drive adapted to drive the cover support in direction of the longitudinal extent of the cover support between a first position and a second position of the cover support corresponding to the open and closed position of the closing screen; and a tilting lever coupling an end region of the closing screen, opposite the front region, to the cover support in an articulated manner, the tilting lever being spring-loaded relative to the cover support and adapted to pivot about a first axis and a second axis that are parallel to the pivot axis; and a stop adapted to limit the closing movement of the closing screen in the closing movement direction, before the second position of the cover support is reached.

2. The closing device of claim 1, wherein the closing screen is at least one of entirely and partially beneath an edge region of the component of the motor vehicle that surrounds said closing screen in the open position of the closing screen.

3. The closing device of claim 1, wherein the cover support is adapted to move along a linear movement path.

4. The closing device according to claim 1, wherein the cover support is adapted to move along an arcuate movement path.

5. The closing device according to claim 1 further comprising a guide fixed to the vehicle, the cover support being adapted to move in the guide.

6. The closing device according to claim 5, wherein the guide is a guide groove.

7. The closing device according to claim 1, wherein the cover support is a toothed rack adapted to engage a drive pinion of the reversible drive.

8. The closing device according to claim 7, wherein the drive pinion is adapted to be rotatably driven by an electric motor.

9. The closing device according to claim 1, further comprising a joint pin, wherein the internal clearance formed by an elongated hole which extends in the direction of extent of the cover support, the joint pin projecting into the elongated hole, extending coaxially to the pivot axis and being arranged at the front-end region of the closing screen.

10. The closing device according to claim 9, wherein the joint pin is arranged on the closing screen by an eccentric axis and is adjustable such that the joint pin is rotatable about the eccentric axis.

11. The closing device according to claim 1, wherein the tilting lever is spring-loaded in relation to the cover support by a prestressed torsion spring.

12. The closing device according to claim 1, wherein two substantially identical cover supports are arranged parallel to and at a distance from one another.

13. The closing device according to claim 12, further comprising at least one crossmember connecting the two cover supports to one another.

14. The closing device according to claim 13, further comprising a drive axle fitted with two drive pinions and adapted to be rotatably driven by the reversible drive, wherein the drive axle is arranged such that the drive axle extends transverse to the movement direction of the closing screen, and wherein each cover support is a toothed rack, each of the drive pinions is engaged in one of the toothed racks.

15. The closing device according to claim 1, wherein the stop adapted to be variably adjusted in the movement direction of the closing screen.

16. The closing device according to claim 1, wherein a monitor is driven by the drive mechanism such that the monitor moves from an inactive position, which is covered by the closing screen in the closed position of the closing screen, to an active position, which projects out of the opening in the open position of the closing screen.

17. The closing device according to claim 1, wherein the closing screen in its closed position is in a position flush with an edge region of the component of the motor vehicle that surrounds said closing screen.

\* \* \* \* \*